US010346720B2

(12) United States Patent
Zhang (10) Patent No.: US 10,346,720 B2
(45) Date of Patent: Jul. 9, 2019

(54) ROTATION VARIANT OBJECT DETECTION IN DEEP LEARNING

(71) Applicant: BAE Systems Information and Electronic Systems Integration Inc., Nashua, NH (US)

(72) Inventor: Bingcai Zhang, San Diego, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 5 days.

(21) Appl. No.: 15/806,383

(22) Filed: Nov. 8, 2017

(65) Prior Publication Data

US 2019/0138849 A1    May 9, 2019

(51) Int. Cl.
*G06K 9/00*        (2006.01)
*G06K 9/62*        (2006.01)
(Continued)

(52) U.S. Cl.
CPC ......... *G06K 9/6256* (2013.01); *G06K 9/0063* (2013.01); *G06K 9/00973* (2013.01);
(Continued)

(58) Field of Classification Search
CPC .................................. G06K 9/00; G06F 3/00
(Continued)

(56) References Cited

U.S. PATENT DOCUMENTS 9,904,849 B2 *   2/2018   Estrada ................... G06N 3/04
2015/0269438 A1   9/2015   Samarasekera et al.
(Continued)

OTHER PUBLICATIONS

He, K., X. Zhang, S. Ren and J. Sun, 2015. Deep residual learning for image recognition, 29th IEEE Conference on Computer Vision and Pattern Recognition (CVPR 2016), Jun. 26-Jul. 1, Las Vegas, Nevada, pp. 770-778, http://www.cv-foundation.org/openaccess/content_cvpr_2016/papers/He_Deep_Residual_Learning_CVPR_2016_paper.pdf, 9 pages.
(Continued)

*Primary Examiner* — Abolfazl Tabatabai
(74) *Attorney, Agent, or Firm* — Sand, Sebolt & Wernow LPA (57) ABSTRACT

System and method for detecting objects in geospatial images, 3D point clouds and Digital Surface Models (DSMs). Deep Convolution Neural Networks (DCNNs) are trained using positive and negative training examples. Using a rotation pattern match of only positive examples reduces the number of negative examples required. In DCNNs softmax probability is variant of rotation angles. When rotation angle is coincident with object orientation, softmax probability has maximum value. During training, positive examples are rotated so that their orientation angles are zero. During detection, test images are rotated through different angles. At each angle, softmax probability is computed. A final object detection is based on maximum softmax probability as well as a pattern match between softmax probability patterns of all positive examples and the softmax probability pattern of a target object at different rotation angles. The object orientation is determined at the rotation angle when softmax probability has maximum value.

20 Claims, 7 Drawing Sheets

(51) Int. Cl.
*G06T 3/60* (2006.01)
*G06N 3/08* (2006.01)
*G06N 3/063* (2006.01)

(52) U.S. Cl.
CPC .......... *G06K 9/6202* (2013.01); *G06K 9/623* (2013.01); *G06K 9/6215* (2013.01); *G06N 3/063* (2013.01); *G06N 3/08* (2013.01); *G06T 3/60* (2013.01); *G06K 2209/21* (2013.01)

(58) Field of Classification Search
USPC ......................................................... 382/103
See application file for complete search history.

(56) References Cited

U.S. PATENT DOCUMENTS

| | | | | |
|---|---|---|---|---|
| 2015/0339571 | A1* | 11/2015 | Krizhevsky | G06N 3/063 382/158 |
| 2016/0307031 | A1* | 10/2016 | Zhong | G06K 9/46 |
| 2017/0301108 | A1 | 10/2017 | Estrada et al. | |
| 2017/0316285 | A1 | 11/2017 | Ahmed et al. | |

OTHER PUBLICATIONS

LeCun, Y. and M'A Ranzato, Deep Learning Tutorial, ICML, Atlanta, GA, Jun. 16, 2013, http://www.cs.nyu.edu/~yann/talks/lecun-ranzato-icml2013.pdf, 204 pages.

Singh, A., Deep Learning Will Radically Change the Ways We Interact With Technology, Harvard Business Review, digital article, Jan. 30, 2017, https://hbr.org/2017/01/deep-learning-will-radically-change-the-ways-we-interact-with-technology, 11 pages.

Zhang, B., Big Geospatial Data + Deep learning + High Performance Computing = Geospatial Intelligence, presentation S6260, 2016 GPU Technology Conference, San Jose, CA, Apr. 4-7, http://on-demand.gputechconf.com/gtc/2016/presentation/s6260-bingcai-zhang-big-geospatial-data-deep-learning-high-performance-computing.pdf, 18 pages.

Zhang, B., 3D DeepObject for precision 3D mapping, presentation S7149, 2017 GPU Technology Conference, San Jose, CA, May 8-11, http://on-demand.gputechconf.com/gtc/2017/presentation/s7149-bingcai_zhang-deepobject-for-precision-printing.pdf, 17 pages.

Cheng et al., Multi-class geospatial object detection and geographic image classification based on collection of part detectors, ISPRS Journal of Photogrammetry and Remote Sensing, Nov. 2014 (Nov. 2014), https://www.sciencedirect.com/science/article/abs/pii/S0924271614002524, 15 pages.

* cited by examiner

ROTATION VARIANT OBJECT DETECTION IN DEEP LEARNING

BACKGROUND

Technical Field

This disclosure is generally directed to the fields of Deep Learning and image object recognition. More particularly this disclosure relates to Deep Learning applied to geospatial imagery. Specifically, the disclosure is directed to automatic object detection in geospatial imagery with near human level accuracy.

Background Information

The field of image analysis has been using Deep Learning for some time. Deep Learning, when used in image analysis, is a method of teaching a computer to analyze data that involves a training phase and a detection phase. In the training phase, the computer learns what a particular object of interest looks like and in the detection phase, the computer uses that learned information to identify that type of object of interest in other images that were not previously provided to the computer.

The training phase involves feeding vast numbers of images into the computer. The images fall into two categories that will be referred to herein as "positive training examples" and "negative training examples". In a positive training example, the image fed into the computer includes the particular object of interest. In a negative training example, the image fed into the computer does not include the particular object of interest. So, for example, if the object of interest is a dog then a positive training example would include a dog while a negative training example would not include a dog.

The computer is programmed with one or more algorithms that help it to process tens of thousands of images in order to learn to recognize the particular object of interest. Positive and negative training examples are utilized in the Deep Learning process. The negative training examples play an important role in helping to train the computer to distinguish between images that include the object of interest and images that do not include the object of interest. For example, tens of thousands of images of dogs may be fed into the computer during the training phase. The computer is then tested by having a series of new images provided to it and then a request is made that dogs be identified in those new images. If the computer mistakes an image of a cat for a dog then that image of the cat is regarded as a negative training example and is fed back into the computer. The algorithms are then rerun to retrain the computer to better identify the object of interest, i.e., dogs. Each negative training example helps the computer learn additional information that will then aid it to more accurately identify objects of interest in new images.

Geospatial images are images of the earth's surface that are obtained using aircraft or satellites, for example and may include 3D point clouds. These images are useful for a number of reasons including studying natural and manmade environments. Melting of glaciers, erosion of river valleys, and changes in coastlines are some aspects of the natural environment that can be studied and mapped using geospatial images. Mapped cities showing roads, building, parking lots, traffic flow etc., are part of the manmade environment that can be monitored using geospatial images. These images are also useful in the creation of maps or mapping software. Deep Learning is particularly useful for analyzing geospatial images.

One of the challenges, not just in Deep Learning but in many machine learning systems, is the requirement for the provision of a sufficient number of training images (also known as training examples). Object detection from images is a very complex problem. With respect to detection of cars from images, for example, if one assumes that there are ten car manufacturers, each producing ten different models of cars, each of which is offered in ten colors; then there are potentially 10×10×10=1000 cars that a system may need to be able to identify. This is a manageable number if the images are not geospatial images. However, utilizing geospatial images of cars present additional issues. Firstly, geospatial images of objects of interest may look very different at different scales or under different lighting conditions or when taken from different perspectives. If one assumes that each of these three factors (scale, lighting, and perspective) has twenty variations, then there are potentially 20×20×20×1000=8 million different scenarios that may need to be identifiable. This is a much increased challenge over that presented by non-geospatial images.

As indicated earlier herein, previously known methods of Deep Learning required both positive training examples and negative training examples. For instance, to teach a DCNN to recognize the digit "1", in previously known Deep Learning methods, many images of the handwritten digit "1" were required and even more images that are not the digit "1" were required. These latter images would be the negative training examples, and the number is open-ended since the images of not digit "1" are essentially unlimited. Therefore, previously known methods of Deep Learning tend to be about 50% similar to human learning since human learning tends to be focused more on positive learning opportunities than negative learning opportunities.

Geospatial images present additional challenges relative to non-geospatial images. Geospatial images are often very large and there may be thousands of objects in the imagery. Additionally, the orientation of objects in the imagery is unpredictable. Objects within an image may also occupy only a small number of pixels (for example, less than 100 pixels). Weather conditions and natural phenomena such as trees may at least partially, obscure objects of interest in such images. Geospatial images tend to include a considerable variation in the pixels because of lighting conditions, look angle, scale variation and a variety of other factors. Because of the unique set of factors that have to be taken into account when analyzing geospatial images, the number of positive training examples and negative training examples required for Deep Learning may be enormous and the incidence of accurate object detection may be lowered because of these variables.

To help increase object detection accuracy, some presently known systems for detecting objects in geospatial images include an Automatic Feature Extraction (AFE) capability. AFE may include numerous hand-crafted algorithms for discovering and delineating buildings and neighboring trees from inside point clouds to aid in more accurately detecting objects of interest. The results are somewhat successful but the methodology does not easily extend to circumstances beyond those for which the specific algorithms were designed. AFE uses traditional, fixed or engineered features, such as edges of buildings, as a hand-crafted feature extractor. Use of AFE may therefore result in a computer that is a "simple" trainable classifier of objects.

SUMMARY

There remains a need in the art for an improved system and method for identifying objects of interest in geospatial images. The present disclosure relates to a system and method that substantially reduces the number of training image examples required for Deep Learning; particularly the number of negative image examples required to train a Deep Convolutional Neural Network (DCNN) or Convolutional Neural Network (CNN). (The terms DCNN and CNN may be used interchangeably herein). The present disclosure relates to a process using a trainable feature extractor, resulting in a much more powerful trainable classifier of objects. The trainable classifier consists of quite complex models rather than simpler primitives, such as edges.

A system and method for finding geospatial objects from geospatial images or 3D point clouds is disclosed herein. Objects in geospatial images or 3D point clouds (i.e., a Digital Surface Model or DSM) may have different orientations. In one embodiment Deep Convolutional Neural Networks (DCNN), the softmax probability is variant of rotation angles. When the rotation angle is coincident to the object orientation, the softmax probability has a maximum value.

In one example during training of the DCNN, all positive training examples are rotated such that their orientation angles are zero. During a testing or detection phase, testing images and test 3D point clouds are rotated. At each rotation angle, a softmax probability is computed. A final object detection is based on both a maximum softmax probability as well as a pattern match between the softmax probability patterns of all positive training examples vs. the softmax probability pattern of a target object at different rotation angles. The object orientation is determined at the rotation angle when softmax probability has maximum value.

The present disclosure further relates to software processing that is specifically designed to accurately detect geospatial objects in geospatial images; both aerial images and satellite images. Some geospatial objects such as vehicles are rotation variant in DCNNs. Using this variant property, data normalization may be performed as part of the learning process. In this application, the learning process may be termed "Simplicity Learning". Utilizing the rotation variant property in data normalization during Simplicity Learning substantially reduces the requirement for large numbers of training examples, especially negative training examples and achieves near human level object detection accuracy. The reason for this is that rotation variant object detection simplifies the complexity of object detection in geospatial images.

In one aspect, the present disclosure provides a method of identifying objects of interest in a geospatial image, the method comprising flying a vehicle through the sky and over a region of the surface of the Earth; taking one or more geospatial images of the region of the surface of the Earth with a camera or a 3D scanner provided on the vehicle; inputting the one or more geospatial images into a database in a central processing unit (CPU); selecting a plurality of training examples including a first plurality of positive training examples and a second plurality of negative training examples; linking the CPU with a graphics processing unit (GPU); downloading the plurality of training examples into a Deep Convolutional Neural Network (DCNN) provided in the GPU; and training the DCNN using the plurality of training examples; and inputting at least one additional geospatial image into the CPU; identifying an object of interest in the at least one additional geospatial image using the trained DCNN; wherein the accuracy of detecting objects of interest in the at least one additional geospatial image is improved by taking the following actions in the selecting of the plurality of training examples: generating positive training examples that have zero orientation angles; generating positive training examples and negative training examples that have substantially the same ground sample distance (GSD); selecting the positive training examples having zero orientation angles and the positive and negative training examples that have the same GSD for downloading into the DCNN and training the DCNN; and wherein the following action is taken after training the DCNN: generating rotation patterns of only the positive training examples utilized in the training of the DCNN; generating rotation patterns of objects in the at least one additional geospatial image; matching the rotation pattern of the positive training examples with the rotation pattern of objects in the at least one additional geospatial image and detecting the objects of interest in the at least one geospatial image based on the generated rotation pattern.

In one example, the process of generating the positive training examples includes selecting positive training examples that contain an object of interest using one or more of rotation normalization, scale normalization or color normalization to reduce pixel variations in the positive training examples. Generating the positive training examples that have zero orientation angles includes rotating each of the positive training examples through one or more orientation angles; and computing a softmax probability at each of the one or more orientation angles. The method in a further embodiment includes generating patterns between the softmax probabilities and the orientation angles. The method in a further embodiment includes determining where a rotation angle is coincident with an object orientation; or determining where the softmax probability is of a maximum value. The method in a further embodiment includes computing a similarity between generated patterns using a pattern similarity algorithm; and merging two similar generated patterns into one pattern using a pattern merge algorithm. Additionally, the method in a further embodiment includes determining at least one outlier pattern; eliminating the at least one determined outlier pattern; and the merging may occur after the at least one determined outlier pattern has been eliminated. Determining the outlier pattern may include determining when the maximum softmax probability of the generated pattern is smaller than a predetermined threshold using a threshold algorithm. Detecting the objects of interest may include utilizing a multi-phase rotation variant object detection algorithm.

Utilizing the trained DCNN further comprises eliminating false positive objects from the image utilizing a pattern matching algorithm and filtering out regions of the image that are free of objects of interest.

Generating positive training examples and negative training examples that have the same GSD includes processing the positive and negative training examples using a scale normalization algorithm.

The detecting of the objects of interest in a further example includes detecting the objects of interest at near human accuracy levels. Typically, humans are able to detect objects of interest in geospatial images at an accuracy level of about 99.9%. Utilizing the present system and method, a trained DCNN is able to detect objects of interest at an accuracy level of about 99.3%.

In the method the one or more additional geospatial images may include a first geospatial image of a first location on the surface of the Earth taken at a first time period and a second geospatial image taken at the first location at a second time period; and the method further includes comparing the first geospatial image with the second geospatial image; detecting objects of interest in the first geospatial image and in the second geospatial image utilizing the trained DCNN and the generated rotation patterns; and determining changes occurring in the first region of the Earth's surface based on the detected objects of interest. The method in a further embodiment includes rotating the at least one additional geospatial image or 3D point cloud or DSM.

Generating the positive training examples that have zero orientation angles includes utilizing a bilinear interpolation algorithm; and computing an output pixel value from several adjacent pixels in each of the positive training examples. In one embodiment, four adjacent pixels may be utilized.

In accordance with another aspect, the present disclosure in one embodiment provides a system for detecting objects of interest in a geospatial image comprising a vehicle that travels across the sky a distance above the Earth's surface; a camera or 3D scanner provided on the vehicle; said camera configured to produce one or more geospatial images of the Earth's surface and said 3D scanner configured to produce one or more 3D point clouds or one or more Digital Surface Models (DSMs) of the Earth's surface; a central processing unit (CPU); a graphics processing unit (GPU) operatively linked to the CPU; a Deep Convolutional Neural Network (DCNN) provided in the GPU; a rotation normalization algorithm provided in the CPU; wherein the one or more geospatial images, the 3D point clouds or the DSMs are inputted into the CPU; wherein at least some of the inputted one or more geospatial images, 3D point clouds or DSMs are processed in the CPU using the rotation normalization algorithm to produce a plurality of positive training examples of zero orientation angles; and the plurality of positive training examples of zero orientation angles are inputted into the GPU to train the DCNN.

The system in one embodiment comprise a scale normalization algorithm provided in the CPU; wherein at least some of the inputted one or more geospatial images, 3D point clouds or DSMs are processed in the CPU using the scale normalization algorithm to produce a plurality of positive training examples and negative training examples having substantially the same ground sample distance (GSD); and wherein the plurality of positive training examples and plurality of negative training examples of the same GSD are inputted into the GPU to train the DCNN. The DCNN is a DCNN model; and the system further includes a pattern generation algorithm; a pattern similarity algorithm; and a pattern merge algorithm; wherein the pattern generation algorithm, the pattern similarity algorithm and the pattern merge algorithm are provided in the CPU or GPU and process the plurality of positive training examples to generate patterns between softmax probabilities and rotation angles of the plurality of positive training examples. The scale normalization algorithm in one embodiment is provided in the DCNN for use with the plurality of training examples along with a means for rotating each of the plurality of positive training examples and the at least one testing image through a series of stepped orientation angles and a means for measuring ground sample distance on each of the plurality of training examples and the at last one testing image. The means for rotating the positive training examples and the at least one testing image as well as the means for measuring ground sample distance may be provided by programming in the DCNN The system may further comprise at least one testing image comprising at least one additional geospatial image, 3D point cloud or Digital Surface Model (DSM) provided from the camera or 3D scanner; and a pattern match algorithm provided in the CPU that processes the at least one testing image and the generated patterns from the CPU or GPU.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

The present disclosure relates to a system and method for finding geospatial objects of interest in geospatial images or 3D point clouds. 3D point clouds are also known as Digital Surface Models (DSM). Objects such as vehicles, ships, airplanes, and houses in geospatial images or 3D point clouds may have different orientations. The present inventor has determined that in Deep Convolutional Neural Networks (DCNN), the softmax probability is variant of rotation angles. When the rotation angle is coincident to the object orientation, the softmax probability has maximum value. This information may be utilized to train a DCNN with a much smaller number of negative training examples than was possible in the past. This information may also be utilized to perform a pattern match between patters from all positive training examples and patterns of a target image (testing image). The pattern match does not use negative training examples, which brings Deep Learning closer to human learning. The pattern match significantly reduces false positive error rate and achieves near human level accuracy.

Figure 1:
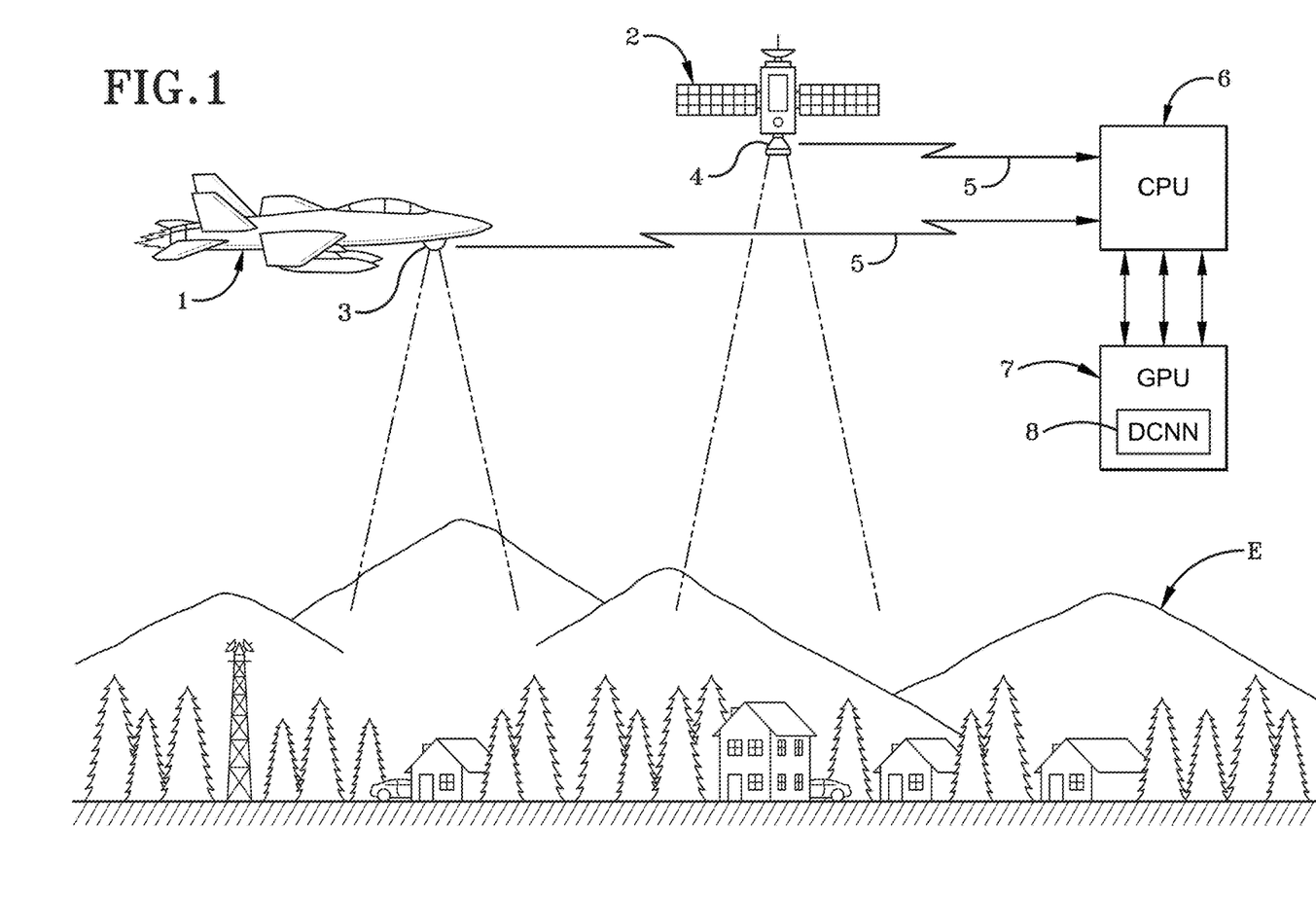
FIG. 1 is a diagrammatic illustration of the system for detecting objects of interest in geospatial images.

FIG. 1 shows the Earth "E" and a vehicle, such as an airplane 1 or a satellite 2 or drone (not shown), moving through the sky a distance above the surface of the Earth "E". The airplane 1 or satellite 2 is provided with equipment for capturing images of regions of the Earth's surface as the airplane 1 or satellite 2 travels through the sky. That equipment may include a camera 3 that is able to capture a photographic geospatial image of a targeted region on the Earth's surface. Alternatively, the equipment may include any type of 3D scanner 4 that is capable of generating a geospatial image in the form of a 3D point cloud (or DSM) of a targeted region on the Earth's surface. One suitable type of 3D scanner could be a Light Detection and Ranging (LiDAR) system. The term "geospatial image" as used herein should be understood to include photographic images, 3D point clouds, DSMs or any other type of image that is captured by any type of vehicle traveling through the sky a distance above the Earth's surface.

Figure 2:
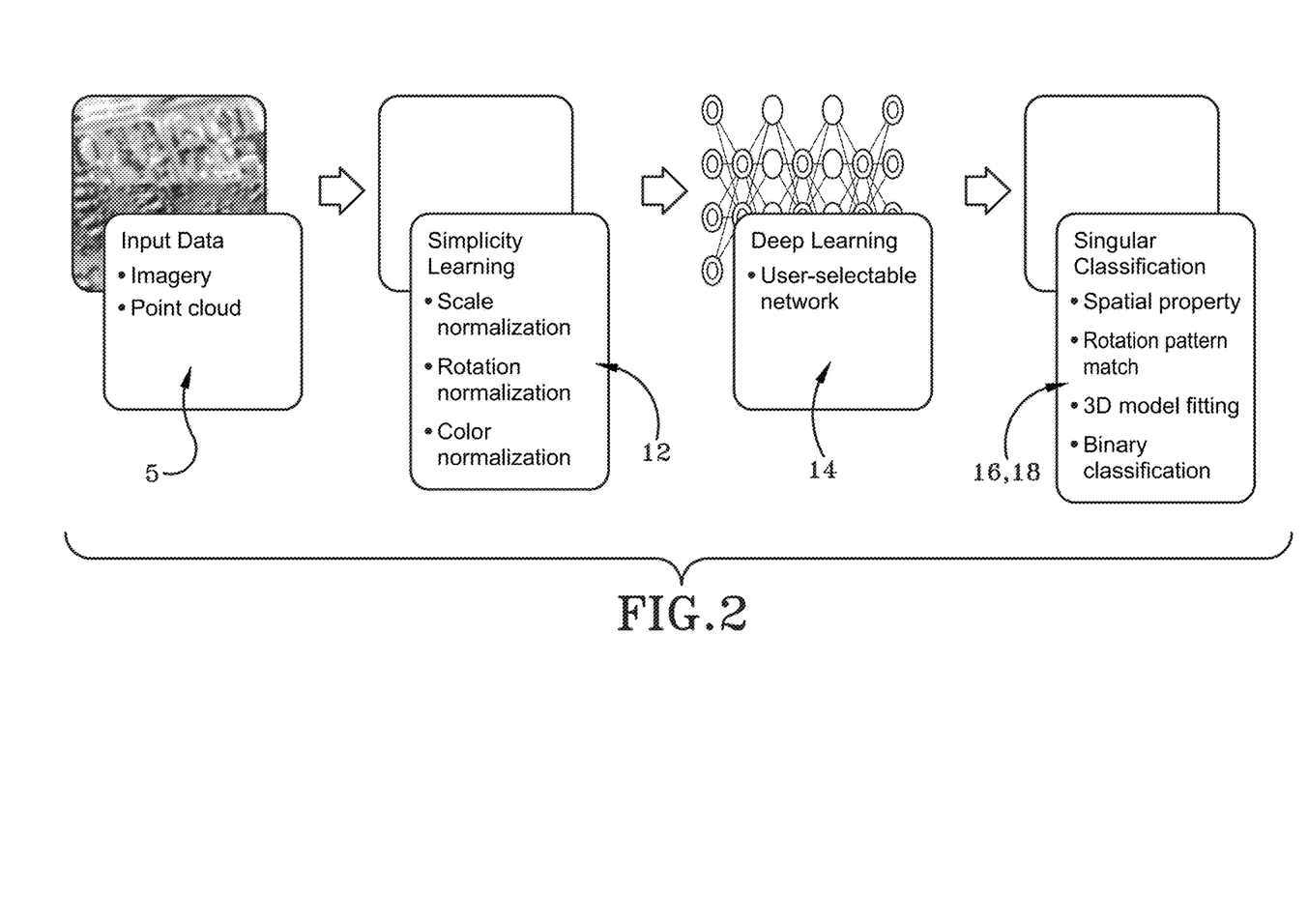
FIG. 2 is a block diagram showing the process of detecting objects of interest in geospatial images.
Figure 3:
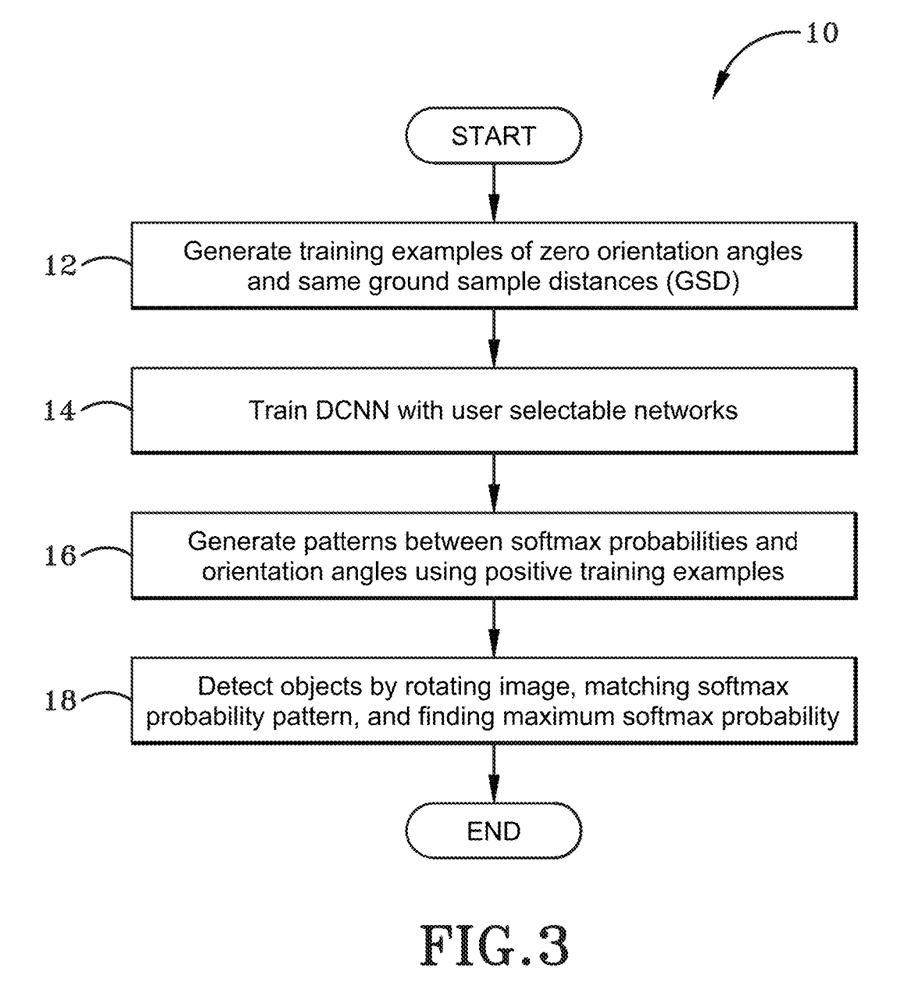
FIG. 3 is a flowchart showing an algorithm for detecting objects of interest from geospatial images where the algorithm includes a "Simplicity Learning" method of rotation normalization and scale normalization, a Deep Learning method, a pattern generation method, and a pattern match method in accordance with the present disclosure.

Referring to FIGS. 1-3, when the geospatial images are captured by the camera 3 or scanner 4, those geospatial images are uploaded as input data 5 into a database on a central processing unit (CPU) 6. CPU 6 is linked to a graphics processing unit (GPU) 7 and the GPU 7 includes a Deep Convolutional Neural Network (DCNN) 8. CPU 6 and GPU 7 are specially programmed with a plurality of algorithms (to be described later herein) that are designed to perform an algorithm 10 (FIG. 3) that has several components.

In a first component 12, which the inventor calls "SIMPLICITY LEARNING" (FIGS. 2 and 3), various specially designed algorithms are utilized to perform scale normalization, rotation normalization, and/or color normalization on the geospatial images input into the database of CPU 6 in order to produce a plurality of training examples. The plurality of training examples includes positive training examples of zero orientation angles and of substantially the same ground sample distances (GSD), and negative training examples of the same GSD. This first component 12 of the process takes place in the CPU 6.

In the second component 14 of algorithm 10, output from the Simplicity Learning 12 will be utilized to train the DCNN 8. The algorithms will be utilized in both CPU 6 and GPU 7 but most of the heavy processing will tend to be done by GPU 7.

Figure 9:
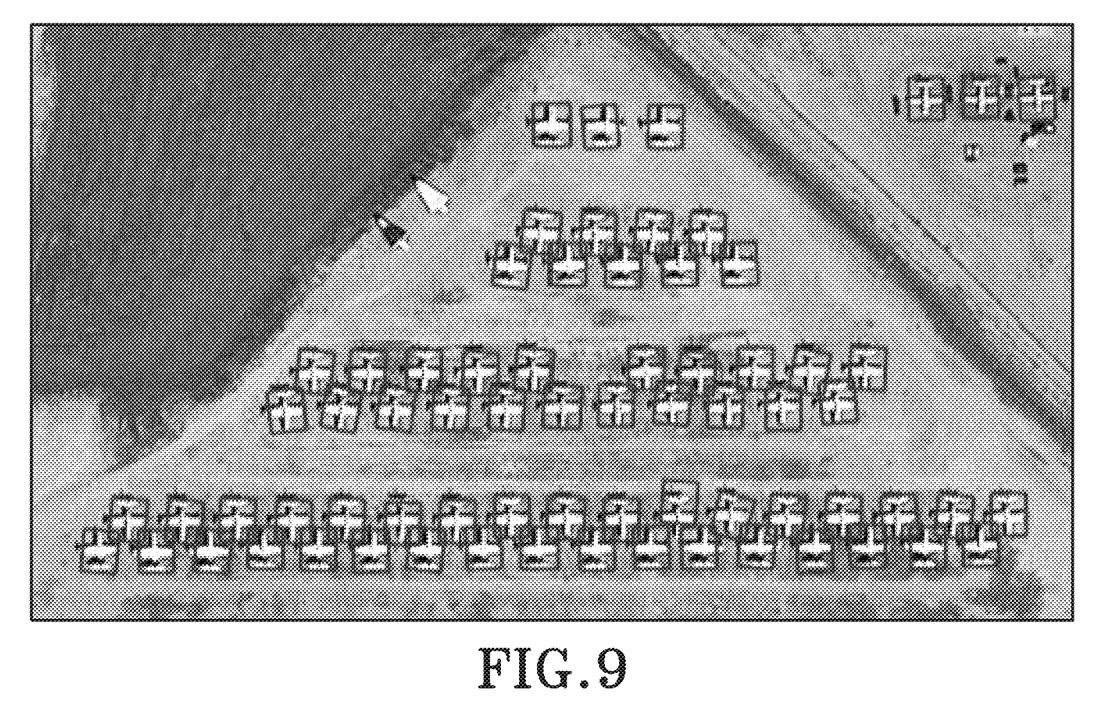
FIG. 9 is an additional geospatial image showing a plurality of objects of interest identified therein utilizing a DCNN trained according to the process disclosed herein.

The output from the second component 14 is a trained DCNN model. (In Deep Learning, the term "model" is used to indicate that the DCNN network has been instantiated or is ready to be deployed.) In a third component 16, which again tends to occur partially in the CPU 6 and partially in the GPU 7, the user will generate patterns between softmax probabilities and orientation angles using only the positive training examples obtained in first component 12. In a fourth component 18, the user will detect objects of interest in one or more new geospatial images that are input into the CPU 6 by rotating these new geospatial images, matching softmax probability patterns with those stored in the trained DCNN and finding the maximum softmax probability. When an object of interest is detected in the new geospatial image then that image may be utilized for any of a wide variety of purposes. For example the DCNN 8 may be trained to identify objects of interest such as military type equipment, e.g., an aircraft or tank. FIG. 9 shows an additional geospatial image that has a plurality of objects of interest (aircraft) identified by a DCNN trained in accordance with the present disclosure. If a first geospatial image is taken of a first region of the Earth's surface at a first time period and a second geospatial image is taken of the first region of the Earth's surface at a second time period, then the first and second geospatial images may be analyzed by the trained DCNN to determine if either of the first and second geospatial images includes any military tanks. If tanks are found in the first geospatial image but not in the second geospatial image then it may be determined that tanks were moved from that first region of the Earth's surface. Alternatively, if tanks are not identified in the first geospatial image but are identified in the second geospatial image then it may be determined that a specific number of tanks were moved into that first region of the Earth's surface. So, for example, a second additional geospatial image of the area shown in FIG. 9 may be taken at a later time period and some of the aircraft may be absent from that second image. It may then be determined that aircraft have been moved from that location on the earth's surface.

A trained DCNN 8 may be utilized for a wide ranges of purposes including monitoring changes in traffic or parking of vehicles in particular locations; changes in land use in cities (e.g. monitoring changes in building structures such as houses or apartment blocks) etc. A DCNN 8 trained in accordance with the present disclosure is trained substantially faster than with previously known systems and is trained using substantially fewer negative training examples than were required with previously known systems.

Figure 4:
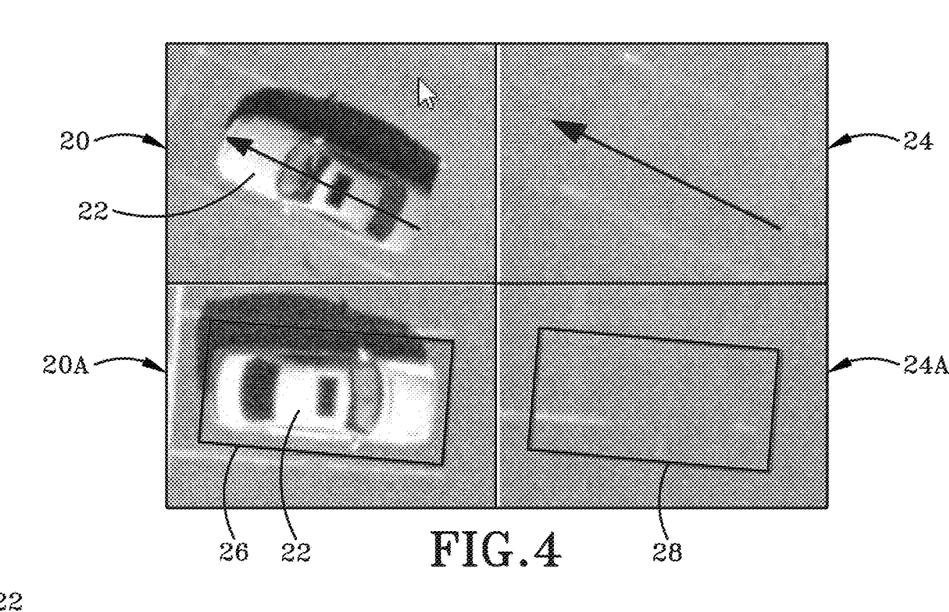
FIG. 4 is a group of several geospatial images illustrating how positive training examples and negative training examples are obtained from images.

Referring once again to FIGS. 2 and 3, the first component 12 of algorithm 10 includes the user gathering input data in the form of geospatial images from aircraft 1 and satellites 2 and/or from 3D point clouds, particular LiDAR point clouds (i.e., Light Detection and Ranging point clouds). Synthetic training data starting from CAD models or image clips found in libraries may also be utilized. These gathered images will be referred to herein as "training examples" In particular the user manually collects a number of positive training examples from the input data. Positive training examples are polygons in the gathered images that contain an object of interest e.g., a vehicle. FIG. 4 illustrates examples of gathered images. The top left corner of FIG. 4 shows an image 20 where an object of interest (in this case, a vehicle 22) is present on image 20. The top right corner of FIG. 4 shows a second image 24 that lacks an object of interest, i.e., there is no vehicle in second image 24. Using appropriate (known) software, the user may extract an image chip or training example from each of the first image 20 and the second image 24. This is accomplished by the user placing a line in the first image 20 and/or the second image 24. Referring again to FIG. 4, the bottom left corner of the figure shows a bounding box 26 placed around vehicle 22. The bounding box 26 is generated based on the line in first image 20. The bottom right corner of FIG. 4 shows another bounding box 28 placed around a portion of the second image 24 but bounding box 28 does not include an object of interest. Again, bounding box 28 is generated based on the line in second image 24. The bottom right corner of FIG. 4 therefore shows an image chip 20A (i.e., bounding box 26 applied around vehicle 22) that is then extracted from the image 20 and is fed into a training database as a positive training example. The bottom right corner of FIG. 4 shows an image chip 24A (bounding box 28 applied around a part of the second image 24 that does not include a vehicle). This image chip 24A is considered to be a negative training example and is also fed into a training database as a negative training example. It should be noted that the size of the image chips utilized in the training examples 20A, 24A is user-selectable. In other words, the user decides how large a bounding box 26 or 28 to place around an object of interest 22 or around a region of the image that does not include an object of interest. A plurality of positive image examples are gathered in a training database for further processing as will be explained hereafter.

Figure 5:
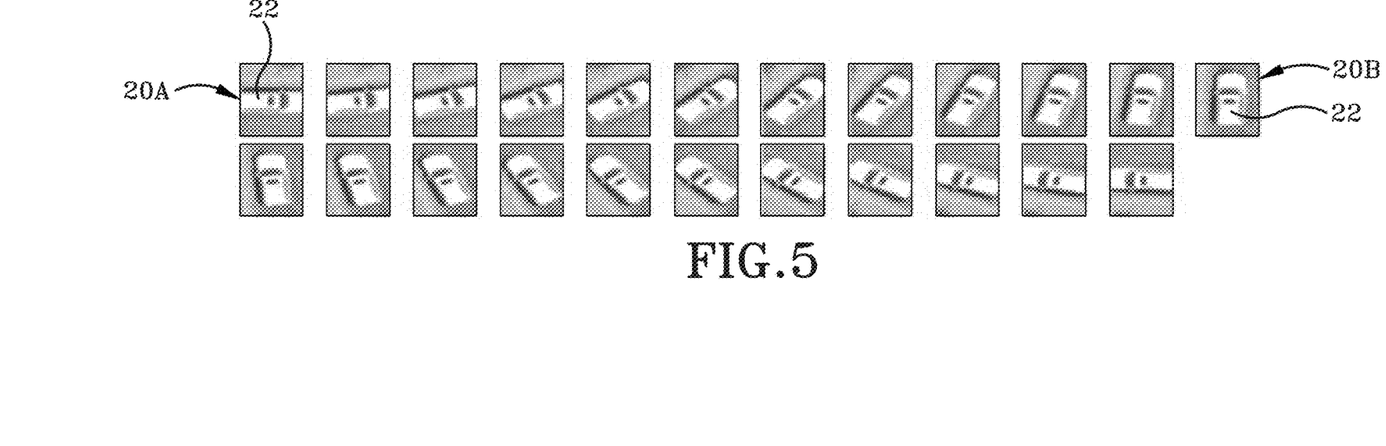
FIG. 5 is a single positive training example that is rotated through twenty-three angle steps, where adjacent angle steps are spaced at about eight degrees relative to each other.

Each of the positive training examples such as image 20A in FIG. 4 is then put through a process that results in generating training examples with zero orientation angles for training the DCNN. This process is illustrated in FIG. 5 and described below. Furthermore, the process may result in training examples with substantially the same ground sample distances (GSDs). In order to generate training examples that are used to generate patterns for pattern match in fourth component 16, each positive training example is rotated through a series of angled steps. In other words, each positive training example 20A is rotated from a first orientation to a second orientation by rotating the image chip 20A through an angle or a particular number of degrees. In one embodiment, adjacent first and second orientations are about eight degrees apart from each other. The image chip 20A is then rotated to a third orientation that may be about eight degrees apart from the second orientation. The image chip 20A is then rotated to a fourth orientation that may be about eight degrees apart from the third orientation and so on.

So, for example, if the starting angle rotation is −88 degrees, then the image chip 20A may be rotated in the following angle steps: −88, −80, −72, −64, −56, −48, −32, −24, −16, −8, 0, 8, 16 and so on. In one embodiment, each image chip 20A may be rotated about twenty-three times with each subsequent orientation being about eight degrees from the previous orientation. (It will be understood that fewer than twenty-three rotations or more than twenty-three rotations of the image chip 20A may be undertaken. It will further be understood that adjacent orientations may be less than eight degrees apart or more than eight degrees apart.)

At each rotation angle (i.e., every eight degrees), a softmax probability may be computed using the formula:

$$\text{softmax: } \frac{e^{z_i}}{\sum_{j=1}^{c} e^{z_j}}$$

The method in one embodiment includes utilizing a plurality of positive image examples such as around one thousand positive training examples. Each positive training example will generate one pattern of softmax probabilities. One pattern of softmax probabilities will include twenty-three values at twenty-three angles. One pattern of softmax probabilities is shown in FIG. 5. FIG. 5 shows an image chip 20A that includes the object of interest 22, and shows object of interest 22 rotated through twenty three times. In particular, the positive training example, i.e., image chip 20A is rotated a number of times, such as twenty-three times, from a negative starting rotation angle to a positive ending rotation angle using the angle step of a certain number of degrees, such as eight degrees.

There are three algorithms utilized in first component 12; namely (1) a rotation normalization algorithm; (2) a scale normalization algorithm; and (3) a color normalization algorithm. The color normalization algorithm is known in the art. However, utilizing a rotation normalization algorithm and a scale normalization algorithm in a method of Deep Learning is not known to the best of the inventor's knowledge. The Deep Learning task is simplified by reducing the pixel variations in the training examples using rotation normalization and/or scale normalization and/or color normalization, thereby enhancing the learning object (i.e., object of interest) by depressing background 3D points.

Deep Learning operates within a framework which enables the user to select a network, i.e., an element of the Deep Learning process that determines the algorithms to be applied in the training and detection processes. Components 16 and 18 (termed "Singular classification") use the rotation property and spatial property of geospatial objects to reduce false-positive error rate and improves positional (XY) accuracy by 3D model fitting. Singular classification uses a rotation pattern match, which can significantly reduce false positive error rate. The Deep Learning task is simplified by reducing it to one type of object at a time.

Rotation Normalization Algorithm

A procedure that performs the computations rotating image chip 20A of any orientation angle into an image chip 20B (FIG. 5) of orientation angle zero. Alternatively, a bilinear interpolation algorithm is used to compute output pixel value from several adjacent pixels in the input image chip. In one embodiment, four adjacent pixels are provided in the input image chip.

Algorithm 1.1 Rotation Normalization Algorithm

Require: i, an m×m input image chip of a positive training example with any orientation angle. The input image chip has a dimension that is at least 1.414 times of the dimension of the output image chip.

Require: r, the rotation angle. With flipping, the rotation angle has a range of [−90°, +90° ]. Without flipping, the rotation angle has a range of [−180°, +180°]. For objects that need to distinguish heads from tails, there is no flipping. For objects that do not need to distinguish heads from tails, there is flipping.

Figure 6:
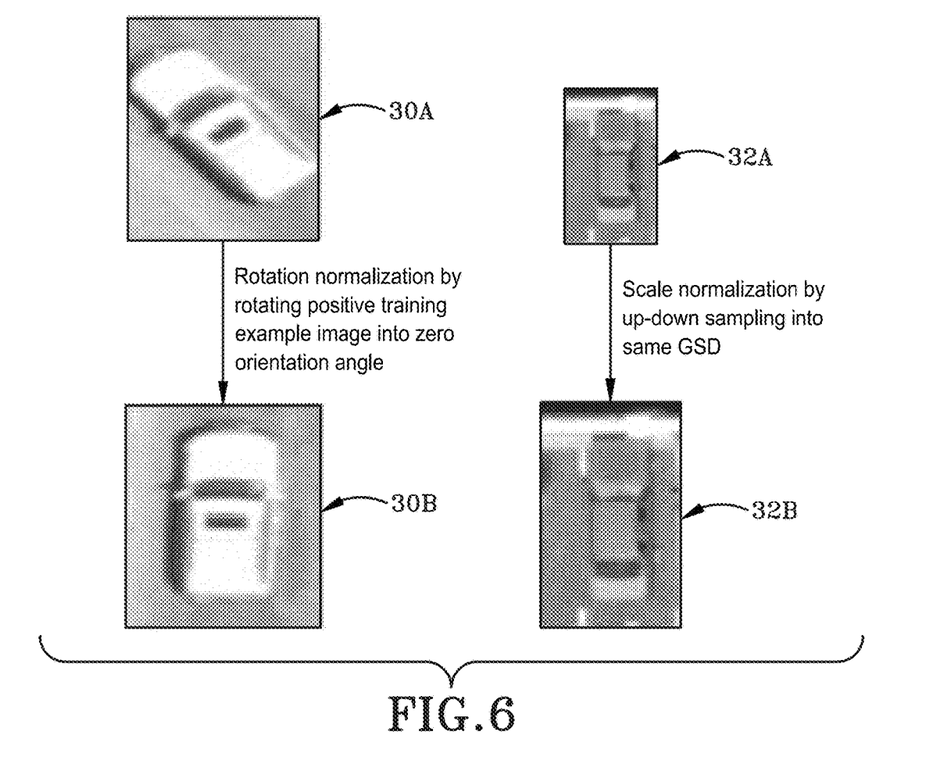
FIG. 6 is a group of several geospatial images illustrating "Simplicity Learning" by rotation normalization and scale normalization.

Require: o, an n×n output image chip after rotation for l=0, . . . , n−1 do
   for s=0, . . . , n−1 do $x=(s-n/2)*\cos(r)-(l-n/2)*\sin(r)+m/2$ $y=(s-n/2)*\sin(r)+(l-n/2)*\cos(r)+m/2$       $o_{[l,s]}=i_{[y,x]}$←alternatively a bilinear interpolation algorithm is used    end for
end for FIG. 6 shows an example of an initial image 30A that is normalized to a final image 30B that has undergone rotation normalization by rotating a positive training example into a zero orientation angle.

Scale Normalization Algorithm

A procedure that performs the computations scaling an image of any ground sample distance (GSD) into a different GSD.

Algorithm 1.2 Scale Normalization Algorithm

Require: i, h×w input image of any GSD
Require: o, n×m output image after scaling
Require: $g_o$, GSD of output image o. It is also the GSD of the DCNN model.
Require: $g_i$, GSD of input image i $n=h/(g_o/g_i)$ $m=w/(g_o/g_i)$ for l=0, . . . , n−1 do
   for s=0, . . . , m−1 do $x=g_o/g_i*(s+0.5)$ $y=g_o/g_i*(l+0.5)$ $o_{[l,s]}$←average pixel value of square cell in input image $i$ defined by:

lower left corner=$[x-g_c/g_i/2.0, y-g_c/g_i/2.0]$ upper right corner=$[x+g_c/g_i/2.0, y+g_c/g_i/2.0]$ end for
end for FIG. 6 also shows an initial image 32A and a final image 32B. Scale normalization by up-down sampling has been undertaken to change the initial image 32A into the final image 32B. Final image 32B may then be fed into the training database. Once positive image examples or training examples of zero orientation angles and same GSD have been generated, the second component 14 of algorithm 10 is the training of the DCNN utilizing the generated positive image examples. So, a plurality of positive image examples and negative image examples are provided to the DCNN along with appropriate software (known in the art) so that the DCNN is trained to recognize the object of interest, such as vehicle 22 (FIG. 5). Because of the use of generated positive images examples with zero orientation angles and same GSD, fewer image examples are required than would be typical for Deep Learning when applied to geospatial images. The output of second component 14 is a trained DCNN.

Figure 7:
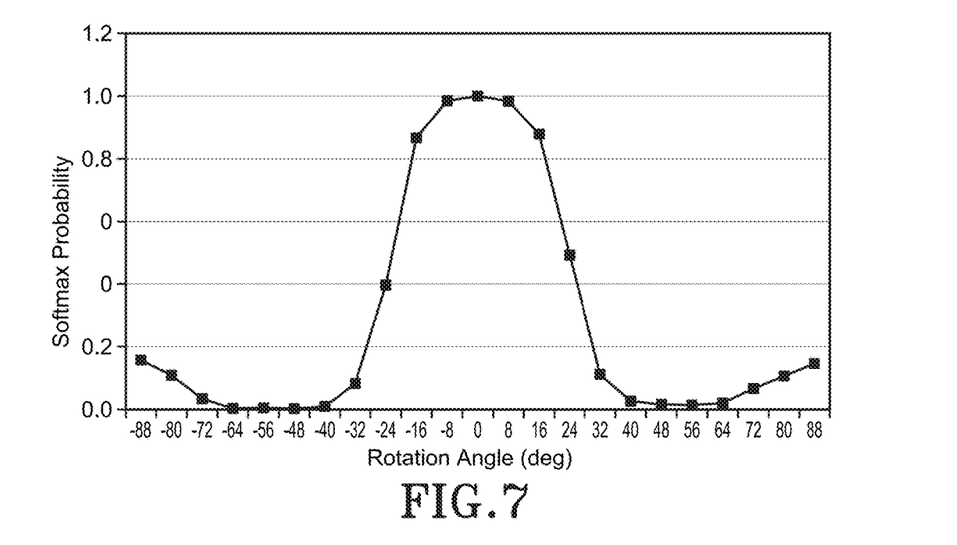
FIG. 7 is a graph showing rotation angles relative to softmax probabilities.

In the third component of algorithm 10, patterns between softmax probabilities and orientation angles using the positive training examples are generated. A typical pattern between rotation angles and softmax probabilities is shown in FIG. 7. In FIG. 7 the horizontal axis is the rotation angle and the vertical axis is the softmax probability. When rotation angle is coincident to object orientation, softmax probability has its maximum value. This pattern is dependent on different objects of interest (such as vehicles, ships, airplanes, and houses), different DCNN networks, and different sets of positive training examples. Therefore, a pattern such as the pattern shown in FIG. 7 must be generated for each DCNN model.

When the probability of a false positive is 0.05 with a single softmax probability, the probability of a false positive could be as small as $(0.05)^{23}=1.19e-30$ with twenty-three softmax probability at twenty-three different rotation angles. Since rotated images are from the same image and the twenty-three softmax probabilities are not completely independent, the probability of a false positive is somewhere between 0.05 and 1.19e-30.

There are several algorithms in this example to generate patterns between rotation angles and softmax probabilities.

Pattern Generation Algorithm
A procedure that performs the computations generating patterns between rotation angles and softmax probabilities using all positive training examples generated in first component 12.
Algorithm 3.1 Pattern Generation Algorithm
Require: n, number of positive training examples
Require: m, number of rotations
Require: i, n×m rotated positive training examples
Require: s, n×m softmax probabilities Require: $f_{dcnn}$/trained DCNN model from component 14
for j=0, . . . , n−1 do
    for k=0, . . . , m−1 do $s_{[j,k]} = f_{dcnn}(i_{[j,k]})$ end for
end for Pattern Similarity Algorithm
A procedure that computes the similarity between two patterns.
Algorithm 3.2 Pattern Similarity Algorithm
Require: m, number of rotations
Require: $s_1$, pattern 1 of m softmax probabilities
Require: $s_2$, pattern 2 of m softmax probabilities
Require: w, a vector of m weights at different rotation angles
Require: t, total weight initialized to 0.0
Require: a, a parameter in the range of [0.3, 1.0] for weight computation
Require: s, similarity between two patterns
    for j=0, . . . , m−1 do $d = |j-1-m/2|*a+1.0$ $w_{[j]} = 1.0/(d*d)$ $t \leftarrow t+w_{[j]}$ end for $s=0.0$←similarity between two patterns, initialize to 0.0 for j=0, . . . , m−1 do $s \leftarrow s+|s_{1[j]}-s_{2[j]}|*(w_{[j]}/t)$ end for Pattern Merge Algorithm
A procedure that performs the computations merging two similar patterns into one pattern. There are likely many patterns from Algorithm 3.1 that are similar. This algorithm merges similar patterns to reduce the number of unique patterns. Prior to pattern merge, outlier patterns are eliminated. When the maximum softmax probability of a pattern is smaller than a threshold such as 0.6, this pattern is likely an outlier and that outlier pattern is eliminated. The threshold of softmax probability s_p_t is determined in this procedure.
Algorithm 3.3 Pattern Merge Algorithm
Require: n, number of patterns
Require: m, number of rotations
Require: s, n×m softmax probabilities from Algorithm 3.1
Require: c, n×n similarity scores between two patterns
Require: t, a threshold value for merging two patterns such as 0.015
Require: $f_s$, Algorithm 3.2

```
h = 1    ← initialize h (number of merged patterns) to 1 for the while loop
While h > 0 do
    for j = 0, . . . , n−1 do
        for k = j + 1, . . . , n−1 do
            c[j, k] = f_s (s[j], s[k])    ← s[j] and s[k] are one dimensional vectors
            c[k, j] = c[j, k]
        end for
    end for
        done = false
        h = 0
    while( done == false)
        done = true
        w.min = 1.0    ← w.min is the minimum similarity score
                          between two patterns
        for j = 0, . . . , n − 1 do
            for k = j + 1, . . . , n − 1 do
                if (c[j, k] < w.min )
                    w.min = c[j, k]    ← find two patterns that are
                                          most similar
                    w.idx1 = j         ← index of pattern j, do not merge
                                          this pattern
                    w.idx2 = k         ← this pattern may be merged
                                          if c[j, k] has the minimum value
                end if
```

```
              endend for
          end for
          if ( w.min < t )
              done = false
              for k = 0, . . . , m-1 do
                  s_{w.idx1 [k]} = (s_{w.idx1 [k]} + s_{w.idx2[k]} ) / 2.0 ← merge pattern
                                                      s_{w.idx2} into s_{w.idx1}
              end for
              remove pattern s_{w.idx2}
              mark s_{w.idx1} and s_{w.idx2} not to be used in if (c_{[j, k]} < w.min ) in
              current while loop
              h ← h + 1
          end if
      end while done
      n = n - h
  end while h
  s_p_t = 1.0   ← initialize to 1.0 (s_p_t is always < 1.0)
  for j = 0, . . . , n-1 do
      z = 0.0
      for k = 0, . . . , m-1 do
          if (s_{[j, k]} > z)
              z = s_{[j, k]}
          end if
      end for
      if( z < s_p_t )
          s_p_t = z
      end if
  end for
```

Algorithm 3.4 Pattern match algorithm. For a given input pattern w, this procedure matches w against n patterns p generated from n positive training examples. The minimum similarity score is the pattern match score.
Require: $f_s$, Algorithm 3.2
Require: w, input pattern, a vector of m elements, m is the number of rotations
Require: p, n×m, n is the number of unique patterns $r=1.0$←pattern match score for j=0, . . . , n−1 do $d=f_s(p_{[j]}, w)$ if($d<r$)

$r=d$ end if
  end for

Figure 8:
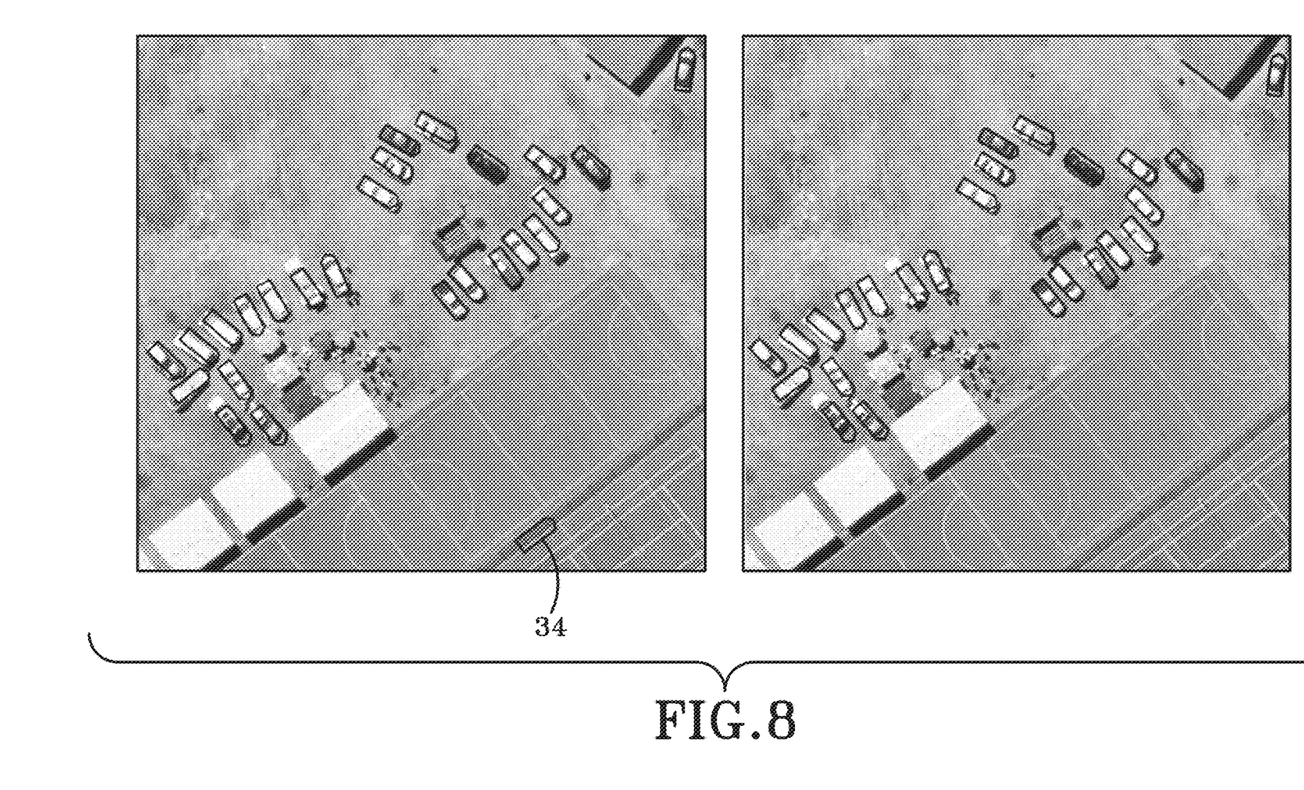
FIG. 8 is a pair of side by side geospatial images where the rotation variant pattern matching algorithm has successfully identified a false positive in the left image and in the right image has successfully eliminated the false positive.

Algorithm 3.5. Pattern match threshold algorithm. This procedure determines the threshold value for rotation pattern match (p_m_t). This threshold value is used later by Algorithm 4.1 (described later herein).
Require: $f_p$, Algorithm 3.4
Require: $f_{dcnn}$, trained DCNN model from component 14
Require: e, n×m number of negative training examples, n examples rotated m times
Require: p, n number of pattern match scores
Require: b, a small user selectable factor such as 0.001
  for j=0, . . . , n−1 do $p_{(j)}=f_p(f_{dcnn}(e_{[j]}))$ end for
  sort p from minimum to maximum $p\_m\_t=\mathrm{Min}(t, p_{[b*n]})$ As shown in FIG. 8, the rotation variant pattern matching algorithm using only positive training examples has successfully identified a false positive 34 in the left image of FIG. 8. The right image in FIG. 8 has cars detected with the pattern match algorithm of the present method but the pattern match algorithm has successfully eliminated the false positive 34 of the left image. A 3×3 pattern match scores of the false positive are shown in the following table

| 0.03 | 0.30 | 0.32 |
| 0.04 | 0.28 | 0.32 |
| 0.31 | 0.31 | 0.32 |

The average matching score of a 3×3 window centered at this location is 0.24, which is above the threshold value of 0.20. Therefore, this false positive 34 is successfully removed by the pattern matching algorithm.

Algorithm for the Fourth Component

The inputs for the fourth component 18 of algorithm 10 are a trained DCNN model from second component 14, patterns between softmax probabilities and rotation angles from third component 16, and a geospatial image or DSM. In fourth component 18 the geospatial image or DSM is rotated in the same manner as the plurality of training examples. The output of fourth component 18 is a feature database of detected objects with geometry data and a set of attributes such as 90% circular error and 90% linear error.

Algorithm 4.1 Multi-phase rotation variant object detection algorithm. For the first phase, a sliding window algorithm with a large line and sample step and rotation angle step are used for speed. A user may use different steps than default steps. Larger steps speed up the detection process with potentially lower detection accuracy. Smaller steps slow down the detection process with potentially higher detection accuracy. The output from the first phase provides initial positions and orientations of potential objects. Most of positions may not have potential objects and therefore they are filtered out from further processing. In the second phase, a much smaller line and sample step such as half of the first phase step is used for the same sliding window algorithm with initial orientation angles and positions from the first phase. For the third phase, an even smaller line and sample step is used with initial orientation angles and positions from the second phase. If the input image or DSM has different GSD from the trained DCNN model GSD, the image or DSM is scaled with Algorithm 1.2.

Require: $f_r$, Algorithm 1.1
Require: $f_{dcnn}$, trained DCNN model from component 14
Require: $f_p$, Algorithm 3.4
Require: s_p_t, the threshold of softmax probability from Algorithm 3.3
Require: p_m_t, the threshold of pattern match score from Algorithm 3.5
Require: c, crop size of $f_{dcnn}$
Require: i, n×m image or DSM.
Require: n, number of lines
Require: m, number of samples
Require: o, object size (length and width) in pixel unit. o=max(length, width)
Require: e, 2D matrix of pattern_match scores and maximum softmax_probability
Require: $r_1$, 2D matrix of maximum softmax_probability and rotation_angle for phase 1
Require: $r_2$, 2D matrix of maximum softmax_probability and rotation_angle for phase 2
Require: g, a factor used to control line and sample step with value in [0.5, 2.0]

Algorithm 4.1.1 for phase 1

```
s₁ = (c - o) / g        ← sliding window step
k = n / s₁              ← number of line steps
p = m / s₁              ← number of sample steps
for d = 0, . . . , k-1 do
    for j = 0, . . . , p-1 do
        r₁[d, j] = f_dcnn (f_r ( d*s₁, j*s₁, c, i, 0 ) ) ← 0 is the initial orientation
                                                           angle
    end for d
end for j
```

Algorithm 4.1.2 for phase 2

```
s₂ = s₁ / 2
k = n / s₂
p = m / s₂
for d = 0, . . . , k-1 do
    for j = 0, . . . , p-1 do
        search a 3x3 window centered at [d/2, j/2] to find
        r₁[d/2, j/s].softmax_probability
        if ( r₁[d/2, j/s].softmax_probability > t₁ ) ← t₁ is a threshold value such
                                                       as 0.25
            r₂[d, j] = f_dcnn ( f_r ( d*s₂, j*s₂, c, i, r₁[d/2, j/s].rotation_angle ) )
        end if
    end for j
end for d
```

Algorithm 4.1.3 for phase 3

```
s₃ = MIN ( MAX ( 1, s₂/ 2) ), 3) ← alternatively, use around 5% of
                                   object size in pixel unit
b = s₂ / s₃
k = n / s₃
p = m / s₃
for d = 0, . . . , k - 1 do
    for j = 0 , . . . , p - 1 do
        search a 3x3 window centered at [d/b, j/b] to find
        r₂[d/b, j/b].softmax_probability
        if ( r₂[d/b, j/b].softmax_probability > t₂ ) ← t2 is a threshold
                                                       value such as 0.60
            e[d, j].softmax_probability =
                f_dcnn ( f_r ( d*s₃, j*s₃, c, i, r₂[d/b, j/b].rotation_angle ) )
            e[d, j].pattern_match =
                f_p ( f_dcnn ( f_r ( d*s₃, j*s₃, c, i, r₂[d/b, j/b].rotation_angle ) ) )
        end if
    end for j
end for d
```

Algorithm 4.1.4 for selecting positive objects and outputting to feature database

```
k = n / s₂
p = m / s₂
for d = 0, . . . , k - 1 do
    for j = 0, . . . , p - 1 do
        if( e[d*b, j*b].softmax_probability > s_p_t and
            e[d*b, j*b].pattern_match < p_m_t)
            search a 5 x 5 window centered at [d*b, j*b] to find maximum
            softmax
            probability and minimum pattern match
            compute line_shift and sample_shift
            l = d * b + line_shift
            s = j * b + sample_shift
            a_s = 0.0
            a_p = 0.0
            for x = -1, 0, 1 do
                for y = -1, 0, 1 do
                    a_s ← a_s + e[l+x, s+y].softmax_probability
                    a_p ← a_p + e[l+x, s+y].pattern_match
                end for y
            end for x
            if ( a_s/ 9.0 > s_p_t and a_p/ 9.0 < p_m_t ) ← alternatively, use
         a weighted average with the center position [l, s] has higher weight
                fdb ( e[l, s] )          ← output to feature database
            end if
        end if
    end for j
end for d
```

As indicated earlier herein, the presently disclosed method is closer to the way humans typically learn because the pattern match uses only positive training examples. For instance, with an image of constant image pixel value, such as all pixels are of 100, DCNN might have 0.05 probability to mistake this image of constant image pixel value as the digit "1" because DCNN has never seen an image of constant pixel value during training. When, for instance, one takes a picture with a smart phone, an image is obtained. The image may have many pixels such as 12 mega pixels. Each pixel has three values (red, green and blue), such as red=86, green=100, and blue=139. Usually the pixel values are different for different pixels. That is the reason a picture can be seen with something in it. A picture with constant pixel values such as a sheet of white paper appears to have nothing in it except white pixels. For white pixels, all three bands (red, green and blue) and all pixels have the same constant values. With the presently disclosed pattern match of twenty-three rotations, the probability of DCNN being mistaken could be reduced to $(0.05)^{23} = 1.19e-30$ or almost 0.0 because the pattern match uses a pattern (twenty-three values) instead of a single value. The twenty-three values are not completely independent because they are rotated images from the same image, therefore, the probability of DCNN being mistaken is somewhere between 0.05 and 1.19e−30. It has been determined that the present method or pattern match may reduce the false positive error rate by an order of magnitude, i.e., by ten times.

It should be understood that while the above disclosure relates to an improved method for Deep Learning for use with geospatial images and 3D point clouds, the same principles applied herein may be utilized for detecting objects of interest in other non-geospatial images or for other purposes unrelated to image analysis.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that are executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" if used herein are used in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", if used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method of identifying objects of interest in a geospatial image, the method comprising:
    flying a vehicle through the sky and over a region of the surface of the Earth;
    taking one or more geospatial images of the region of the surface of the Earth with a camera or a 3D scanner provided on the vehicle;
    inputting the one or more geospatial images into a database in a central processing unit (CPU);
    selecting a plurality of training examples including a first plurality of positive training examples and a second plurality of negative training examples;
    linking the CPU with a graphics processing unit (GPU);
    downloading the plurality of training examples into a Deep Convolutional Neural Network (DCNN) provided in the GPU; and
    training the DCNN using the plurality of training examples; and
    inputting at least one additional geospatial image into the CPU;
    identifying an object of interest in the at least one additional geospatial image using the trained DCNN;
    wherein the accuracy of detecting objects of interest in the at least one additional geospatial image is improved by taking the following actions in the selecting the plurality of training examples:
        generating positive training examples that have zero orientation angles;
        generating positive training examples and negative training examples that have substantially the same ground sample distance (GSD);
        selecting the positive training examples having zero orientation angles and the positive and negative training examples that have the same GSD for downloading into the DCNN and training the DCNN; and
    wherein the following action is taken after training the DCNN:

generating rotation patterns of only the positive training examples utilized in the training of the DCNN;
generating rotation patterns of objects in the at least one additional geospatial image and
matching the rotation pattern of the positive training examples with the rotation pattern of objects in the at least one additional geospatial image and
detecting the objects of interest in the at least one geospatial image based on the generated rotation pattern.

2. The method according to claim 1, wherein generating the positive training examples includes:
using one or more of rotation normalization, scale normalization or color normalization to reduce pixel variations in the positive training examples.

3. The method according to claim 1, wherein generating the positive training examples that have zero orientation angles includes:
rotating each of the positive training examples through one or more orientation angles; and
computing a softmax probability at each of the one or more orientation angles.

4. The method according to claim 3, further comprising:
generating patterns between the softmax probabilities and the orientation angles.

5. The method according to claim 4, further comprising:
determining where a rotation angle is coincident with an object orientation; or
determining where the softmax probability is of a maximum value.

6. The method according to claim 5, further comprising:
computing a similarity between generated patterns using a pattern similarity algorithm.

7. The method according to claim 6, further comprising:
merging two similar generated patterns into one pattern using a pattern merge algorithm.

8. The method according to claim 7, further comprising:
determining at least one outlier pattern;
eliminating the at least one determined outlier pattern; and
wherein the merging occurs after the at least one determined outlier pattern has been eliminated.

9. The method according to claim 8, wherein the determining the outlier pattern comprises:
determining when the maximum softmax probability of the generated pattern is smaller than a predetermined threshold using a threshold algorithm.

10. The method according to claim 1, further comprising:
detecting the objects of interest includes utilizing a multiphase rotation variant object detection algorithm.

11. The method according to claim 1, wherein the utilizing of the trained DCNN further comprises:
eliminating false positive objects from the image utilizing a pattern matching algorithm.

12. The method according to claim 1, further comprising:
filtering out regions of the image that are free of objects of interest.

13. The method according to claim 1, wherein generating of positive training examples and negative training examples that have the same GSD includes processing the positive and negative training examples using a scale normalization algorithm.

14. The method according to claim 1, wherein the detecting of the objects of interest includes detecting the objects of interest at near human accuracy levels.

15. The method according to claim 1, wherein the one or more geospatial images includes a first geospatial image of a first location on the surface of the Earth taken at a first time period and a second geospatial image taken at the first location at a second time period; and the method further includes:
comparing the first geospatial image with the second geospatial image;
detecting objects of interest in the first geospatial image and in the second geospatial image utilizing the trained DCNN and the generated rotation patterns; and
determining changes occurring in the first region of the Earth's surface based on the detected objects of interest.

16. The method according to claim 1; wherein generating the positive training examples that have zero orientation angles includes:
utilizing a bilinear interpolation algorithm; and
computing an output pixel value from several adjacent pixels in each of the positive training examples.

17. A system for detecting objects of interest in a geospatial image comprising:
a vehicle that travels across the sky a distance above the Earth's surface;
a camera or 3D scanner provided on the vehicle; said camera configured to produce one or more geospatial images of the Earth's surface and said 3D scanner configured to produce one or more 3D point clouds of the Earth's surface;
a central processing unit (CPU);
a graphics processing unit (GPU) operatively linked to the CPU;
a Deep Convolutional Neural Network (DCNN) provided in the GPU; and
a rotation normalization algorithm provided in the CPU;
wherein the one or more geospatial images, the 3D point clouds or the DSMs are inputted into the CPU; wherein at least some of the inputted one or more geospatial images, 3D point clouds or DSMs are processed in the CPU using the rotation normalization algorithm to produce a plurality of positive training examples of zero orientation angles; and the plurality of positive training examples of zero orientation angles are inputted into the GPU to train the DCNN.

18. The system according to claim 17, further comprising:
a scale normalization algorithm provided in the CPU; wherein at least some of the inputted one or more geospatial images, 3D point clouds or DSMs are processed in the CPU using the scale normalization algorithm to produce a plurality of positive training examples and negative training examples having substantially the same ground sample distance (GSD); and wherein the plurality of positive training examples and plurality of negative training examples of the same GSD are inputted into the GPU to train the DCNN.

19. The system according to claim 18, wherein the DCNN is a DCNN model; and the system further includes:
a pattern generation algorithm;
a pattern similarity algorithm; and
a pattern merge algorithm;
wherein the pattern generation algorithm, the pattern similarity algorithm and the pattern merge algorithm are provided in the CPU or GPU and process the plurality of positive training examples to generate patterns between softmax probability and rotations angles of the plurality of positive training examples of zero orientation angle.

20. The system according to claim 19, further comprising:
at least one testing image comprising at least one additional geospatial image, 3D point cloud or Digital Surface Model (DSM) provided from the camera or 3D scanner; and a pattern match algorithm provided in the CPU that processes the at least one testing image and the generated patterns from the CPU or GPU.

* * * * *